(12) United States Patent
Kim et al.

(10) Patent No.: US 7,678,452 B2
(45) Date of Patent: Mar. 16, 2010

(54) CARBON NANOTUBE HYBRID SYSTEM USING CARBIDE-DERIVED CARBON, A METHOD OF MAKING THE SAME, AN ELECTRON EMITTER COMPRISING THE SAME, AND AN ELECTRON EMISSION DEVICE COMPRISING THE ELECTRON EMITTER

(75) Inventors: Yoon-Jin Kim, Suwon-si (KR); Jae-Myung Kim, Suwon-si (KR); Hee-Sung Moon, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 12/050,437

(22) Filed: Mar. 18, 2008

(65) Prior Publication Data
US 2008/0248310 A1 Oct. 9, 2008

(30) Foreign Application Priority Data
Apr. 4, 2007 (KR) ...................... 10-2007-0033358

(51) Int. Cl.
B32B 9/00 (2006.01)
(52) U.S. Cl. ...................................... 428/408; 977/742
(58) Field of Classification Search ................. 428/408; 977/742
See application file for complete search history.

(56) References Cited

U.S. PATENT DOCUMENTS

| 4,836,965 | A * | 6/1989 | Hayashi et al. | ............. | 264/658 |
| 6,841,273 | B2 * | 1/2005 | Horiuchi et al. | ............. | 428/698 |
| 2002/0090468 | A1 | 7/2002 | Goto et al. | | |
| 2006/0165988 | A1 | 7/2006 | Chiang et al. | | |

FOREIGN PATENT DOCUMENTS

| JP | 2001-48507 | 2/2001 |
| KR | 2002-23522 | 3/2002 |

(Continued)

OTHER PUBLICATIONS

Registration Determination Certificate issued by the Korean Intellectual Property Office in Korean Application No. 2007-33358 on Mar. 24, 2008.

(Continued)

*Primary Examiner*—David R Sample
*Assistant Examiner*—Daniel Miller
(74) *Attorney, Agent, or Firm*—Stein McEwen, LLP

(57) ABSTRACT

A carbon nanotube hybrid system includes: a carbide-derived carbon prepared by reacting a carbide compound and a halogen group containing gas to extract elements of the carbide compound except carbons; metals supported on the carbide-derived carbon or remaining in the carbide-derived carbon; and carbon sources from which carbon nanotubes are grown from the carbide-derived carbon. A method of preparing the carbon nanotube hybrid system includes preparing the carbide-derived carbon, extracting elements therefrom, and growing carbon nanotubes from the carbide-derived carbon. The carbon nanotube hybrid system has excellent uniformity and a long lifetime. An electron emitter having improved electron emitting properties can be inexpensively prepared using the carbon nanotube hybrid system compared to conventional carbon nanotubes. An electron emission device having excellent electron emitting properties can be prepared using the electron emitter.

20 Claims, 7 Drawing Sheets

FOREIGN PATENT DOCUMENTS

| WO | WO 01/16023 | 3/2001 |
| WO | WO 2006/127017 | 11/2006 |

OTHER PUBLICATIONS

V. Ivanov et al., "The study of carbon nanotubules produced by catalytic method", Chemical Physics Letters, Vol. 223, Jun. 24, 1994 pp. 329-335.

S. Welz et al. "Carbon structures in silicon carbide derived carbon", Journal of Materials Processing Technology, vol. 179, No. 1-3, Oct. 20, 2006, pp. 11-22.

Office Action issued in corresponding European Patent Application No. 08153934.8 dated Sep. 8, 2008.

* cited by examiner

CARBON NANOTUBE HYBRID SYSTEM USING CARBIDE-DERIVED CARBON, A METHOD OF MAKING THE SAME, AN ELECTRON EMITTER COMPRISING THE SAME, AND AN ELECTRON EMISSION DEVICE COMPRISING THE ELECTRON EMITTER

CROSS-REFERENCE TO RELATED APPLICATION

This application claims the benefit of Korean Application No. 2007-33358, filed on Apr. 4, 2007, in the Korean Intellectual Property Office, the disclosure of which is incorporated herein by reference.

BACKGROUND OF THE INVENTION

1. Field of the Invention

Aspects of the present invention relate to a carbon nanotube hybrid system using carbide-derived carbon, an electron emitter including the same, and an electron emission device including the electron emitter, and more particularly, to a carbon nanotube hybrid system that can be prepared using a less expensive method than that used to manufacture conventional carbon nanotubes and that has excellent uniformity and a long lifetime, an electron emitter including the same, and an electron emission device including the electron emitter.

2. Description of the Related Art

In general, electron emission devices can be classified into electron emission devices using hot cathodes as an electron emission source and electron emission devices using cold cathodes as an electron emission source. Examples of electron emission devices using cold cathodes as an electron emission source include field emitter array (FEA) type electron emission devices, surface conduction emitter (SCE) type electron emission devices, metal insulator metal (MIM) type electron emission devices, metal insulator semiconductor (MIS) type electron emission devices, and ballistic electron surface emitting (BSE) type electron emission devices.

FEA type electron emission devices operate based on a principle that a low work function material or high beta function material as an electron emission source easily emits electrons due to an electric charge difference under a vacuum condition. Recently, tip-shaped structures mainly formed of Mo, Si, or the like; carbonaceous material, such as graphite, diamond like carbon (DLC), or the like; and nano materials such as nanotubes, nanowires, or the like have been developed as electron emission sources for FEA type electron emission devices.

In an SCE type electron emission device, a first electrode faces a second electrode on a first substrate, and a conductive thin film having fine cracks is located between the first and second electrodes. These fine cracks are used as an electron emission source. In this structure, when a voltage is applied to the device, current flows in the surface of the conductive thin film and electrons are emitted through the fine cracks acting as an electron emission source.

MIM type electron emission devices and MIS type electron emission devices respectively include an electron emission source having a metal-dielectric layer-metal (MIM) structure and an electron emission source having a metal-dielectric layer-semiconductor structure. When a voltage is applied between the metals or between a metal and a semiconductor separated by a dielectric layer, electrons move, are accelerated, and are emitted from the metal or semiconductor having a higher electron charge to the metal having lower electron charge.

BSE type electron emission devices operate based on a principle that when a semiconductor is miniaturized to a dimension smaller than a mean free path of the electrons of the semiconductor, electrons travel without being dispersed. In particular, an electron supply layer formed of a metal or a semiconductor is formed on an ohmic electrode, an insulating layer and a thin metal film are formed on the electron supply layer, and a voltage is applied to the ohmic electrode and the thin metal film to emit electrons.

In addition, FEA type electron emission devices can be categorized into top gate type electron emission devices and bottom gate type electron emission devices according to locations of cathodes and gate electrodes. Furthermore, FEA type electron emission devices can be categorized into diode emission devices, triode electron emission devices, tetrode electron emission devices, etc., according to the number of electrodes used.

In the electron emission devices described above, carbon-based materials, included in an emitter, for example, carbon nanotubes, which have good conductivity, electric field concentration, electric emission properties and a low work function, are commonly used.

However, carbon nanotubes commonly have a fiber shape having a high field enhancement factor $\beta$, and fiber type carbon nanotube materials have many problems, such as poor uniformity and a short lifetime. Further, when fiber type carbon nanotubes are manufactured in a paste, an ink, a slurry, or the like, problems occur during manufacturing processes compared with other particle type materials, and raw materials of the fiber type carbon nanotubes are expensive.

Recently, research on materials consisting of inexpensive carbide-based compounds that can be substituted for carbon nanotubes have been conducted in order to overcome these disadvantages (Korean Patent Publication No. 2001-13225).

SUMMARY OF THE INVENTION

Aspects of the present invention provide a carbon nanotube hybrid system using carbide-derived carbon that can be prepared using a less expensive method than that used to manufacture conventional carbon nanotubes and that has excellent uniformity and a long lifetime, a method of preparing the same, an electron emitter including the carbon nanotube hybrid system, and an electron emission device including the electron emitter.

According to an aspect of the present invention, there is provided a carbon nanotube hybrid system including: a carbide-derived carbon prepared by reacting a carbide compound and a halogen group containing gas to extract elements of the carbide compound except carbons; metals supported on the carbide-derived carbon or remaining in the carbide-derived carbon; and carbon nanotubes grown on the carbide-derived carbon from a supplied carbon source.

According to another aspect of the present invention, there is provided a method of preparing a carbon nanotube hybrid system, the method including: extracting all elements of a carbide compound except carbon by reacting the carbide compound and a halogen group containing gas; mixing the carbide-derived carbon with a metal-containing compound and performing a hydrogen reduction reaction to transfer a metal from the metal-containing compound to the carbide-derived carbon; and reacting the prepared carbide-derived carbon and a carbon source to grow carbon nanotubes from the prepared carbide-derived carbon.

According to another aspect of the present invention, there is provided a method of preparing a carbon nanotube hybrid system, the method including: extracting elements of a carbide compound except carbon by reacting the carbide compound and a halogen group containing gas, and reacting the resultant and a carbon source to grow carbon nanotubes from the prepared carbide-derived carbon.

According to another aspect of the present invention, there is provided an electron emitter including the carbon nanotube hybrid system.

According to another aspect of the present invention, there is provided an electron emission device comprising the electron emitter.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
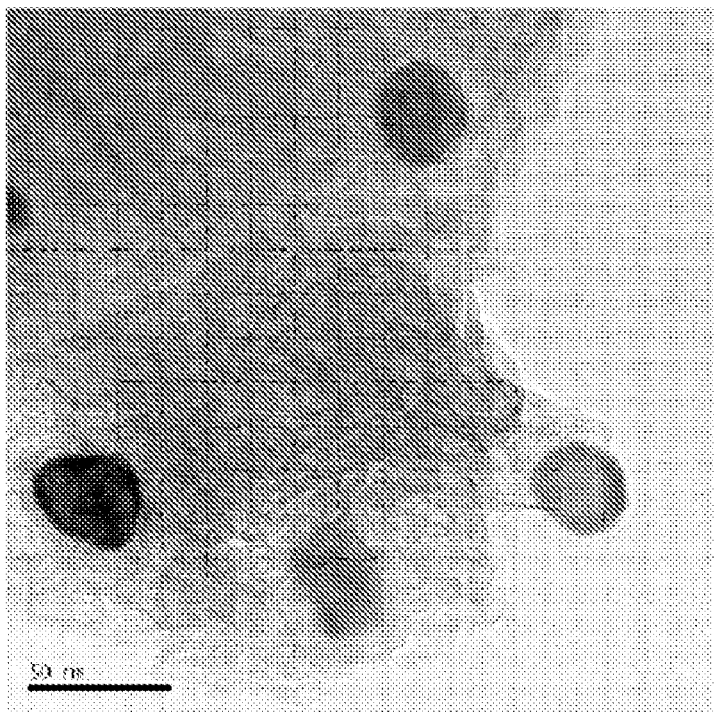
FIG. 1A is a transmission electron microscope (TEM) image of a surface of a carbide-derived carbon on which a metal catalyst is supported in the initial stage of a synthesis of a carbon nanotube hybrid system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the aspects of present invention by referring to the figures.

A carbon nanotube hybrid system according to aspects of the present invention can be prepared by reacting the following: a carbide-derived carbon (prepared by reacting carbide compounds) and a halogen group containing gas to extract all elements of the carbide compounds except carbons; metals supported on the carbide-derived carbon, particularly on at least one of pores and surfaces of the carbide-derived carbon (preferably on both of pores and surfaces of the carbide-derived carbon) or remaining in the carbide-derived carbon; and carbon sources. The carbon nanotube hybrid system has a structure in which carbon nanotubes are grown from the carbide-derived carbon, particularly from at least one of pores and surfaces of the carbide-derived carbon (preferably from both of pores and surfaces of the carbide-derived carbon). The carbon nanotube hybrid system can be inexpensively prepared, have excellent electron emitting properties, and be used to prepare an electron emitter having excellent electron emitting properties and an electron emission device including the electron emitter.

The metals supported on pores and surfaces of the carbide-derived carbon or remaining in the carbide-derived carbon may be catalyst metals that can assist the growth of the carbon nanotubes. The catalyst metals have nanosize particles, and more particularly, a particle size distribution in the range of a sub-nanometer scale, i.e., a particle size of less than 1 nm to a nanometer scale particle size.

A radius of the carbon nanotube (CNT) is determined according to the particle size range of the catalyst metals, and thus fine CNT can be obtained using the catalyst metals having a small particle size distribution. The catalyst metals may have a particle size distribution in the range of a sub-nanometer to 5 nm. When those catalyst metals are supported on the carbide derived carbon, a single-walled nanotube (SWNT), double-walled nanotube (DWNT), or thin multi-walled nanotube (thin-MWNT) can be prepared having a thickness of less than or equal to several nanometers, but such thickness can be varied according to types of carbon sources, synthesis temperature, and synthesis time. Particularly, a carbon nanotube hybrid system having 10 walls or less and a diameter of 20 nm or less may be formed. Further, a carbon nanotube hybrid system having MWNT which grow from a carbide-derived carbon when $C_2H_2$ gas is used as the carbon source of the carbon nanotube hybrid system can be prepared.

Figure 1B:
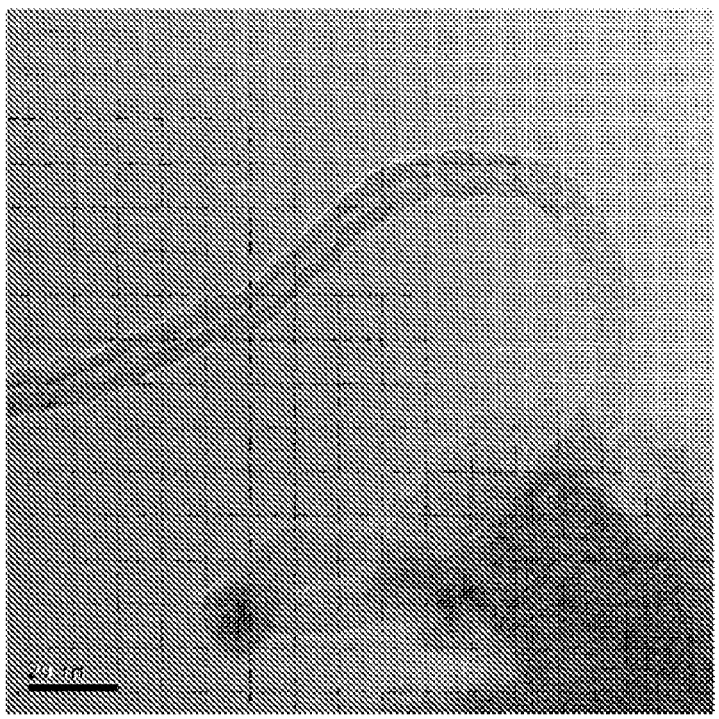
FIG. 1B is a TEM image illustrating a carbon nanotube hybrid system according to an embodiment of the present invention.
Figure 1C:
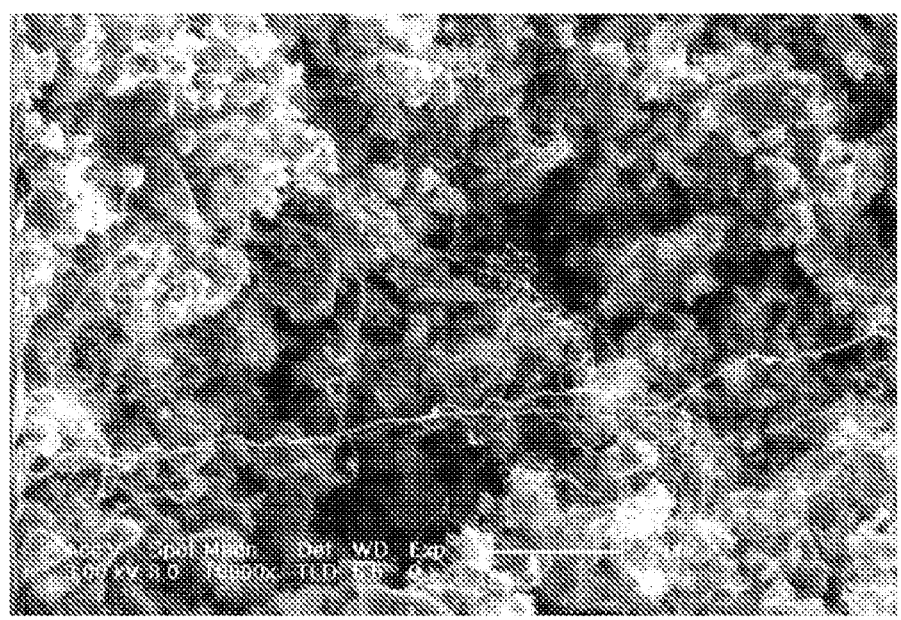
FIG. 1C is a scanning emission microscope (SEM) image illustrating a carbon nanotube hybrid system according to an embodiment of the present invention.

FIG. 1A is a transmission electron microscopy (TEM) image of a surface of a carbide-derived carbon on which a metal catalyst is supported in the initial stage of a synthesis of a carbon nanotube hybrid system according to an embodiment of the present invention. A carbon layer grows from the supported catalyst. FIG. 1B is a TEM image illustrating a carbon nanotube hybrid system according to an embodiment of the present invention. As shown in FIG. 1A, a multi-walled carbon nanotube grows from the surface of carbide-derived carbon on which the metal catalyst is supported.

The CNTs may grow perpendicularly to the substrate. The CNTs may be prepared by removing metals through chlorination using a metal carbide as a carbon precursor at a high temperature and using the carbon-derived carbon (CDC) material according to the method described above. When the carbon nanotube hybrid system having such structure is used as an electron emitter, excellent electron emitting properties may be obtained as well as uniform electron emission may be induced by ohmic contact with a lower electrode. Tips of the CNTs may have a needle shape as illustrated in FIG. 1B to provide a field enhancement factor (β-factor), but the shape of the tips of the CNTs is not limited thereto.

Carbide-derived carbon which is used to prepare carbon nanotubes according to aspects of the present invention may be prepared by reacting carbide compounds and a halogen group containing gas to extract all elements of the carbide compounds except carbons. As disclosed in Korean Patent Publication No. 2001-13225, carbide-derived carbon having a nano porosity throughout may be prepared using a method including (i) forming work pieces comprised of particles of carbide compounds having a predetermined transport porosity, and (ii) thermochemically treating the work pieces with a halogen group containing gas at a temperature in the range of 350 through 1600° C. to extract all atoms of the work pieces except carbon atoms.

When the carbide-derived carbon prepared using the above method is analyzed using Raman peaks, the carbide-derived carbon has intensity ratios of a graphite G band at 1590 cm$^{-1}$ to a disordered-induced D band at 1350 cm$^{-1}$ is in the range of 0.3 to 5, or a BET surface area of 950 m$^2$/g, preferably 950-1400 m$^2$/g. When the carbide-derived carbon is analyzed using X-ray diffraction, a weak or wide single peak of a graphite (002) surface can be seen at 2θ=25°. The carbide-derived carbon prepared using the above method has a q value indicating a degree of crystallinity in the range of 0 to 60.

Figure 1D:
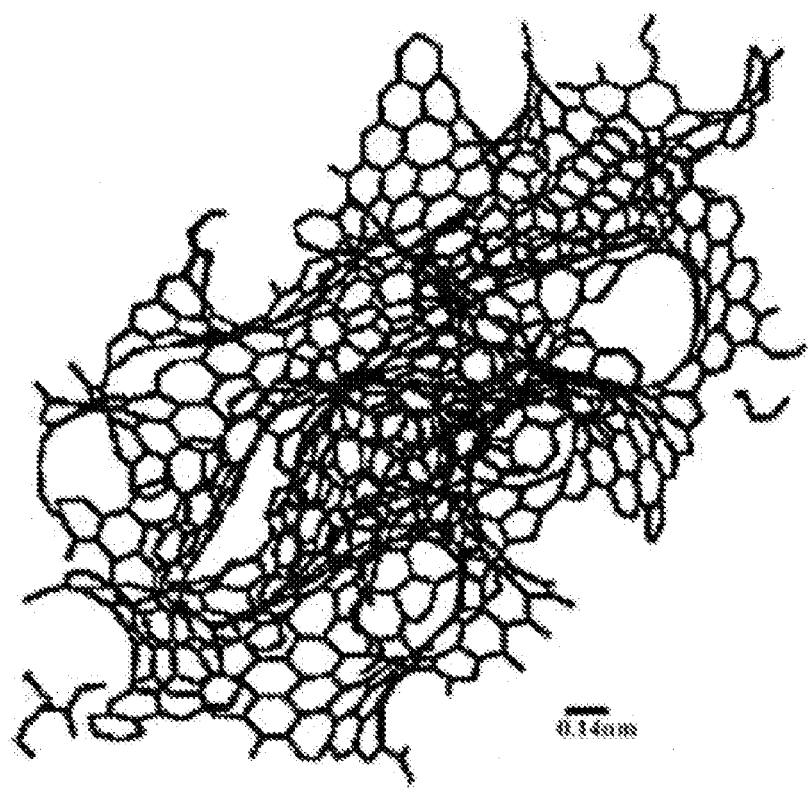
FIG. 1D is a schematic diagram illustrating a nano structure of a conventional carbide-derived carbon.

Generally, results of analysis of the Raman peaks, X-ray diffraction and electron microscopy are commonly used as criteria to indicate degrees of crystallinity. Carbide-derived carbon according to aspects of the present invention has a structure that has a degree of crystallinity in a short range order and is similar to that of amorphous carbon as determined as described above. It has been documented that amorphous carbon having a degree of crystallinity in a short range order has a structure where bending graphite sheets and open pores, including non-6-membered rings, are mixed (Enn Lust et al., *J. Electroanalytical Chem.*, vol. 586, pp 247, 2006). FIG. 1D is a view illustrating a nanostructure of amorphous carbon disclosed in the above reference. Carbide-derived carbon having such structure as illustrated in FIG. 1D and has excellent electron emitting properties. The nanostructure of the carbide-derived carbon emits fields from open pores, having a structure of a non-6-membered ring, and the open pores are perpendicular to a surface of the carbide-derived carbon.

Figure 2A:
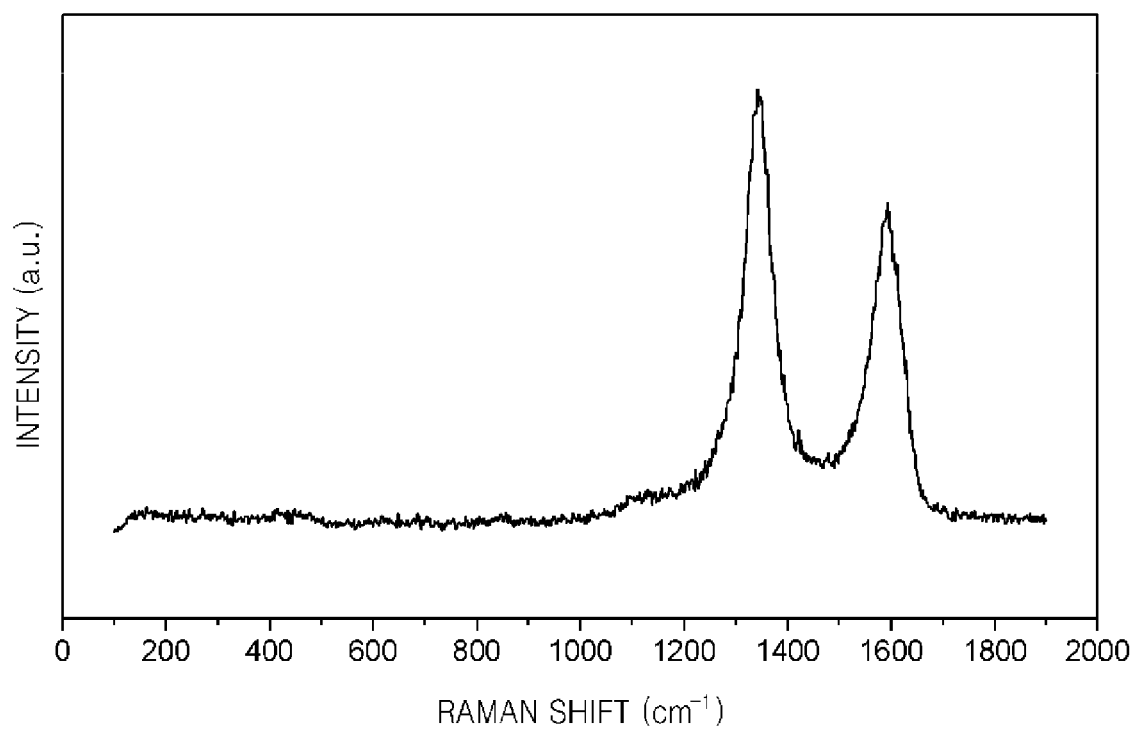
FIG. 2A is a graph of Raman peak analysis results of a carbide-derived carbon according to an embodiment of the present invention.

FIG. 2A is a graph of Raman peak analysis results of a carbide-derived carbon according to an embodiment of the present invention (514.532 nm, D1 filter, Ar ion). Referring to FIG. 2A, the carbide-derived carbon has an intensity ratio ($I_G/I_D$) of a graphite G band at 1590 cm$^{-1}$ to a disordered-induced D band at 1350 cm$^{-1}$ of about 0.76.

Figure 2B:
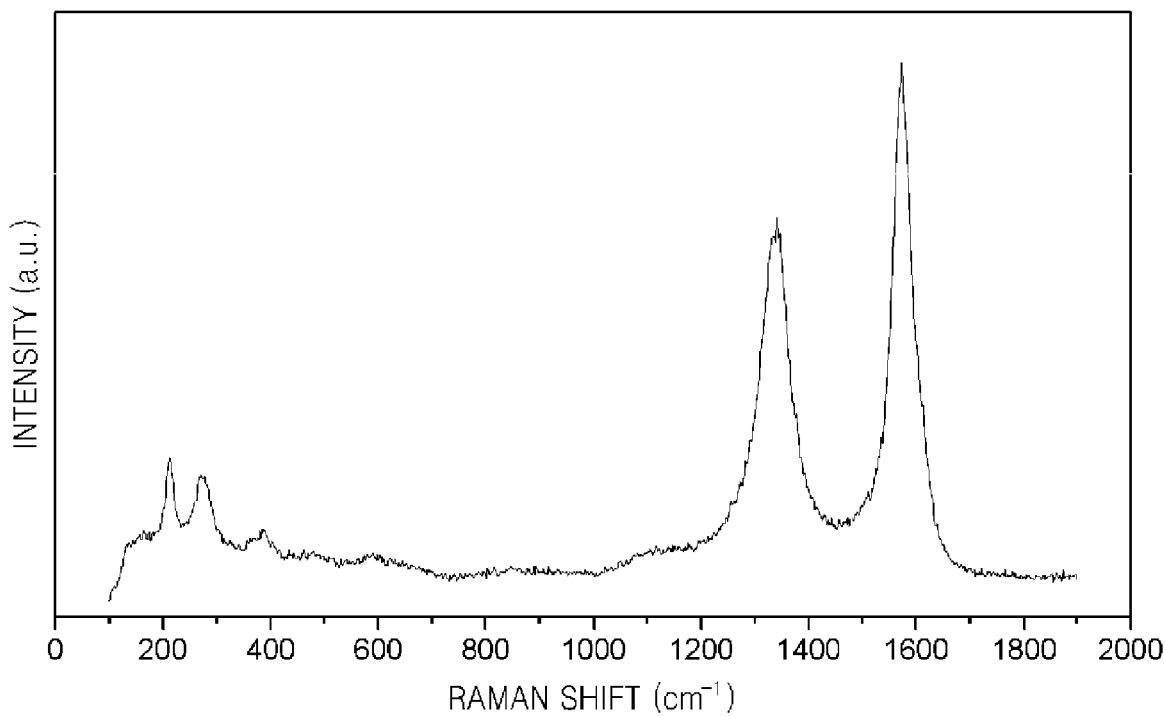
FIG. 2B is a graph of Raman peak analysis results of a carbon nanotube hybrid system according to an embodiment of the present invention.

FIG. 2B is a graph of Raman peak analysis results of a carbon nanotube hybrid system prepared from the carbide-derived carbon of FIG. 2A using a method according to an embodiment of the present invention (514.532 nm, D1 filter, Ar ion). Referring to FIG. 2B, the intensity of the graphite G band at 1590 cm$^{-1}$ the carbon nanotube hybrid system increases compared to that of the carbide-derived carbon of FIG. 2A. Further, the intensity ratio ($I_G/I_D$) of a graphite G band at 1590 cm$^{-1}$ to a disordered-induced D band at 1350 cm$^{-1}$ increased to about 2.46. In addition, it is identified that SWNT grow from pores and surfaces of the carbide-derived carbon as indicated by radial breathing mode (RBM) peaks generated at 164.03, 212.01, 270.75 cm$^{-1}$, and the like which are related to curvature of SWNT. Analyzer used in such Raman peak analysis is HORIBA 800UV commercially available from HORIBA JOBINYVON. The Raman peak analysis was performed using an internal laser (Ar). The laser has an output of 20-30 mW, and a wavelength of 514.5 nm. Exposing time of the laser is 120 sec, and a size of beam hole is 100 μm.

Figure 3:
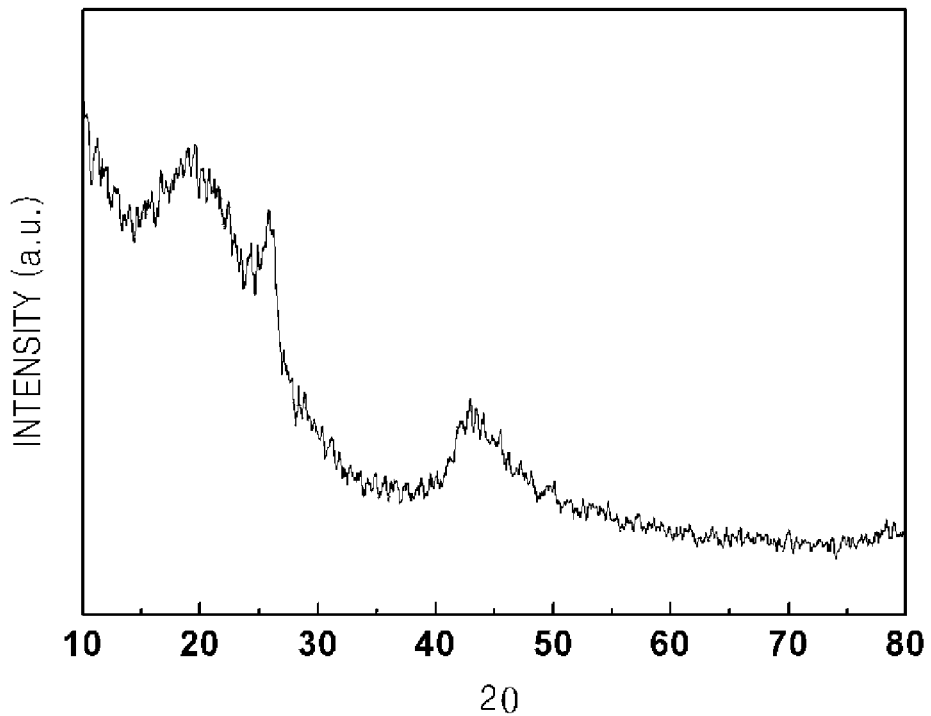
FIG. 3 is a graph of X-ray diffraction results of carbide-derived carbon according to an embodiment of the present invention.

FIG. 3 is a graph of X-ray diffraction results of carbide-derived carbon according to an embodiment of the present. Referring to FIG. 3, in the carbide-derived carbon, a weak peak of a graphite (002) surface can be seen at 2θ=25.9°. When a crystal structure of graphite is a hexagonal pillar, the peak of the graphite (002) surface is a peak generated by X-ray diffraction emitted in parallel with an upper surface of the hexagonal pillar. Typically, a very strong peak of the conventional crystalline graphite can be seen at 2θ=25°. However, a very weak peak of the carbide-derived carbon according to an embodiment of the present invention can be seen at 2θ=25°. Accordingly, the carbide-derived carbon according to an embodiment of the present invention has amorphous properties unlike the conventional crystalline graphite. Further, a full width at half maximum (FWHM) of the carbide-derived carbon is 6.6878°.

Figure 4:
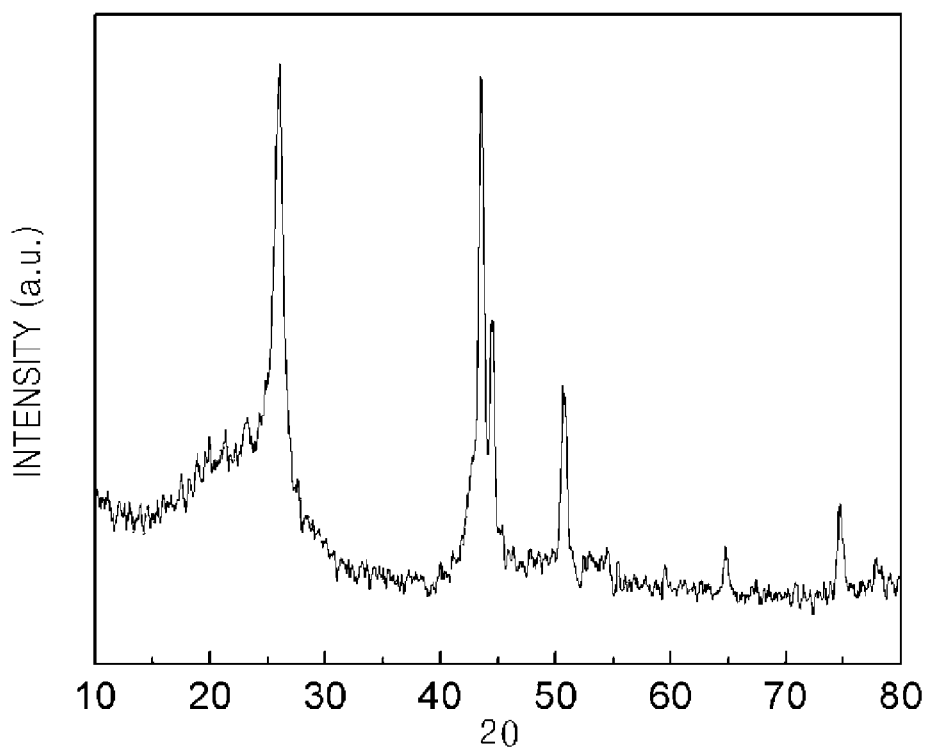
FIG. 4 is a graph of X-ray diffraction results of a carbon nanotube hybrid system according to an embodiment of the present invention.

FIG. 4 is a graph of X-ray diffraction results of a carbon nanotube hybrid system prepared from the carbide-derived carbon according to an embodiment of the present invention. Referring to FIG. 4, the FWHM decreases to 0.89368°. Such change results from an increase of a degree of crystallinity as carbon nanotubes grow from the surfaces and pores of the carbide-derived carbon.

Figure 5:
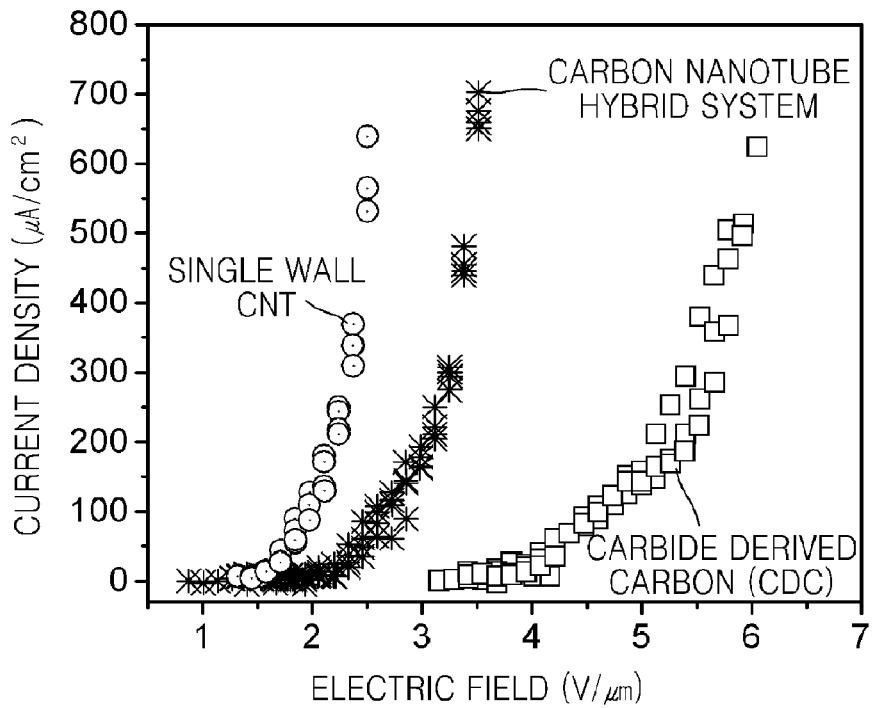
FIG. 5 is a graph illustrating field emission results of a carbon nanotube, a carbide-derived carbon and a carbon nanotube hybrid system according to an embodiment of the present invention.

FIG. 5 is a graph illustrating field emission results of a single wall carbon nanotube, a carbide-derived carbon, and a carbon nanotube hybrid system according to an embodiment of the present invention. A single wall carbon nanotube, a carbide-derived carbon, and a carbon nanotube hybrid system were respectively turned on at 1.5 V/μm, 3.5 V/μm, and 1.9 V/μm, and respectively reached 700 μA/cm$^2$ at 2.5 V/μm, 6.3 V/μm, and 3.5 V/μm Although emission efficiency of the carbon nanotube hybrid system is lower than the single wall carbon nanotube, the carbon nanotube hybrid system has sufficient emission efficiency for field emission applications, and the carbon nanotube hybrid system has excellent properties in uniform emission, Ohmic contact, lifetime, and the like.

Figure 6:
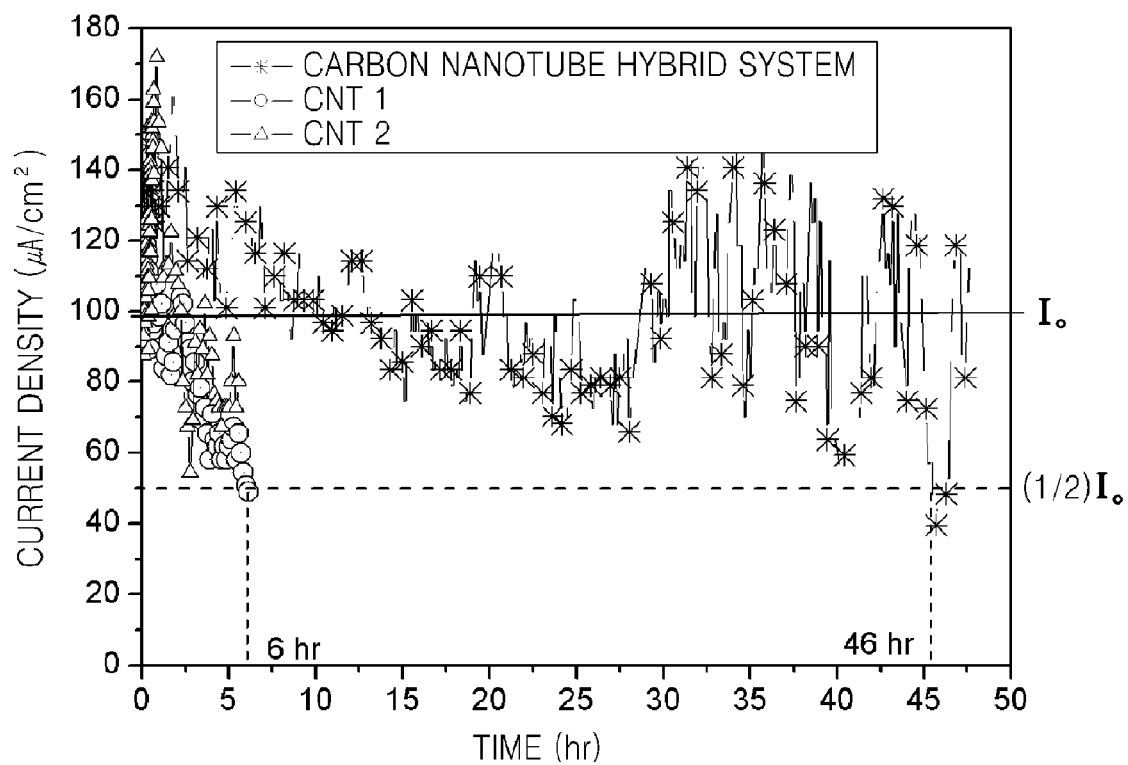
FIG. 6 is a graph illustrating lifetime of a carbon nanotube hybrid system compared to that of a carbon nanotube according to an embodiment of the present invention.

FIG. 6 is a graph illustrating lifetime of a carbon nanotube hybrid system compared to that of a single wall carbon nanotube. J-E loop aging (Target current density: 600 μA/cm$^2$) was conducted 60 times in a DC mode, and lifetimes of a single wall carbon nanotube and a carbon nanotube hybrid system according to an embodiment of the present invention were measured in a DC mode, and constant voltage mode. An initial current density was 100 μA/cm$^2$ (Io) and the lifetime was defined as time between the initial current density and a half-life, i.e., 50 μA/cm$^2$ ((½)I$_o$). The measured lifetime is different from the real lifetime of devices as the real devices operate in an AC mode and frequencies and pulse widths in the AC mode are different from those in the DC mode. However, the lifetime of the devices are measured in the DC mode so that a lifetime can be identified within a short time. Referring to FIG. 6, while the lifetime of the single wall carbon nanotube was about 6 hours, the lifetime of the carbon nanotube hybrid system according to an embodiment of the present invention was about 46 hours, and thus has a 7.6 times improved lifetime characteristic.

Hereinafter, methods of preparing a carbon nanotube hybrid system according to embodiments of the present invention will be described. In a first method of preparing carbon nanotubes according to an embodiment of the present invention, carbide compounds are reacted with a halogen group containing gas at a temperature in the range of 350 to 1600° C. for 4 to 6 hours, and all elements of the carbide compounds except carbons are extracted to prepare carbide-derived carbon.

The carbide compounds are carbon compounds which are respectively reacted with a Group III, IV, V, or VI element, and preferably, diamond-based carbide, such as $SiC_4$ or $B_4C$; metal-based carbide, such as TiC or zirconium carbide; saline carbide, such as $Al_4C_3$ or $CaC_2$; complex carbide, such as titanium tantalum carbide (TiTaC) or molybdenum tungsten carbide (MoWC); carbonitride, such as titanium carbonitride (TiNC) or zirconium carbonitride (ZrNC); or compounds thereof. The carbide compounds may include metals which can act as a catalyst for the growth of the carbon nanotubes. The halogen group containing gas may be $Cl_2$, $TiCl_4$, or $F_2$.

Then, a catalyst metal-containing compound, such as a metal halide, a metal nitrate, and the like, is added to the carbide-derived carbon and mixed, and a hydrogen reduction reaction is performed to obtain carbide-derived carbon on which metals are supported. Here, the metal halide is a halide including a catalyst metal that accelerates the growth of the carbon nanotubes, such as a halide based material including a transition metal, such as nickel halide, cobalt halide, iron halide, and tungsten halide. Meanwhile, the metal nitrate performs similarly to the metal halide and may be a nitrate based material including a transition metal, such as nickel nitrate, cobalt nitrate, iron nitrate, and tungsten nitrate. The amount of the metal halide or the metal nitrate is in the range of 0.1 to 50 parts by weight based on 100 parts by weight of the carbide-derived carbon.

The hydrogen reduction may be performed at a temperature in the range of 200 to 800° C. The metal may be a transition metal such as Ni, Co, Fe, or W, and the metal may be mixed with Mo to prevent catalyst agglomeration and decrease particle size of the catalyst to thereby improve efficiency. The amount of the metals may be in the range of 0.1 to 20 parts by weight based on 100 parts by weight of the total amount of the metals and the carbide-derived carbon.

The prepared carbide-derived carbon is reacted with a carbon source in a high temperature synthesis furnace at a temperature in the range of 600 to 1200° C. to obtain carbon nanotubes. When the temperature is less than 700° C., crystallinity may decrease due to a large amount of defect generated on the outside walls of the CNT. On the other hand, when the temperature is higher than 1200° C., a uniform CNT cannot be obtained as the metal catalyst grows and a multi-wall nanotube having a large radius grows. Pores of the carbide-derived carbon may have a diameter in the range of 0.3 to 10 nm, and the pores may be micropores and mesopores.

A second method of preparing carbon nanotubes according to an embodiment of the present invention will now be described. Carbide compounds are reacted with a halogen group containing gas at a temperature in the range of 350 to 1600° C., and elements of the carbide compounds, except carbon atoms, are partially extracted to prepare carbide-derived carbon. However, metals may remain in the carbide-derived carbon after the extraction of the atoms. Here, the amount of the metal in the carbide-derived carbon may be in the range of 0.1 to 20 parts by weight based on 100 parts by weight of the total amount of the metals and the carbide-derived carbon.

The halogen group containing gas is removed in a synthesis furnace by air purging the resultant, and then a carbon source is supplied to the synthesis furnace and reacted at a temperature in the range of 700 to 1200° C. to obtain a carbon nanotube hybrid system. When the temperature is less than 700° C., crystallinity may decrease due to a number defects on the outside walls of the CNT. On the other hand, when the temperature is higher than 1200° C., a uniform CNT cannot be obtained since the metal catalyst grows and a multi-wall nanotube having a large radius grows.

In the second method, types and amounts of the carbide compounds, the halogen group containing gas, and carbon source are similar to those used in the first method. The carbon source may be ethylene gas, acetylene, a mixed gas of hydrogen and any one of the ethylene gas and acetylene, carbon monoxide, or the like.

Aspects of the present invention also provide that an electron emitter including the carbon nanotube hybrid system may be prepared.

An electron emitter according to an embodiment of the present invention is an electron emitter for cold cathodes. The electron emitter emits electrons by photoelectric emission, electric field emission, or the like, wherein the electrons are generated by secondary electron emission and ion recombination by ion bombarding rather than being heated. In addition, the electron emitter includes the carbide-derived carbon according to aspects of the present invention having excellent electron emitting properties. Accordingly, the electron emitter has excellent electron emission efficiency.

The electron emitter may be manufactured using a method, including preparing a composition for forming an electron emitter and applying and sintering the composition on a substrate, or the like.

First, a composition for forming an electron emitter, including the carbon nanotube hybrid system according to aspects of the present invention and a vehicle, is prepared. The vehicle adjusts printability and viscosity of the composition for forming the electron emitter, and includes a resin and a solvent component. In addition, the composition for forming the electron emitter may further include a photosensitive resin, a photoinitiator, an adhesive compound, a filler, etc.

Next, the composition for forming the electron emitter is applied to the substrate. The substrate on which the electron emitter is formed may vary according to the type of electron emission device to be formed. For example, when manufacturing an electron emission device with gate electrodes between a cathode and an anode, the substrate may be the cathode.

The application of the composition for forming the electron emitter to the substrate may vary according to whether photosensitive resins are included in the composition for forming the electron emitter.

Additional photoresist patterns are unnecessary when the composition for forming the electron emitter includes photosensitive resins. That is, after coating the composition for forming the electron emitter including photosensitive resins on the substrate, the composition for forming the electron emitter is exposed and developed according to desired electron emitter forming regions. However, a photolithography process using additional photoresist patterns may be required when the composition for forming the electron emitter does not include photosensitive resins. That is, after photoresist patterns are formed on the substrate using a photoresist film, the composition for forming the electron emitter is applied to the substrate on which the photoresist patterns have been formed.

The composition for forming the electron emitter applied to the substrate is sintered as described above. The adhesion between the carbide-derived carbon in the composition for forming the electron emitter and the substrate is increased due to the sintering. Many vehicles are volatilized and other inorganic binders, etc., are melted and solidified to enhance the durability of the electron emitter. The sintering temperature should be determined according to the volatilization temperature and volatilization time of the vehicle included in the composition for forming the electron emitter. The sintering may be performed in an inert gas atmosphere in order to inhibit degradation of the carbide-derived carbon. The inert gas may be nitrogen gas, argon gas, neon gas, xenon gas, or a mixture of at least two of the aforementioned gases.

An activation process is alternatively performed on the surface of the sintered resultant. According to an embodiment of the present invention, a solution which can be cured using heat treatment, such as an electron emission source surface treatment material including a polyimide group polymer, is coated on the sintered resultant material and is heat treated. Then, the heat-treated film is delaminated. According to another embodiment of the present invention, an adhesive part is formed on the surface of a roller driving with a predetermined driving source, and an activating process is performed by applying predetermined pressure to a surface of the sintered resultant. Through this activating process, the carbon nanotube hybrid system can be exposed to a surface of the electron emitter or aligned vertically.

Aspects of the present invention also provide for an electron emission device including an electron emitter. An electron emission device according to an embodiment of the present invention includes a first substrate, a cathode and an electron emitter formed on the first substrate, a gate electrode arranged so as to be insulated electrically from the cathode, and an insulating layer arranged between the cathode and the gate electrode to insulate the cathode from the gate electrode. Here, the electron emitter includes a carbon nanotube hybrid system according to aspects of the present invention.

The electron emission device may further include a second insulating layer formed on an upper surface of the gate electrode to further insulate the gate electrode. However, according to aspects of the invention, the electron emission device is not limited thereto. For example, as the gate electrode is insulated by the second insulating layer, the electron emission device may further include a focusing electrode arranged parallel with the gate electrode. The electron emission device may be used in a vacuum electric device such as a flat display, a television, an X line tube, an emission gate amplifier, or the like.

Figure 7:
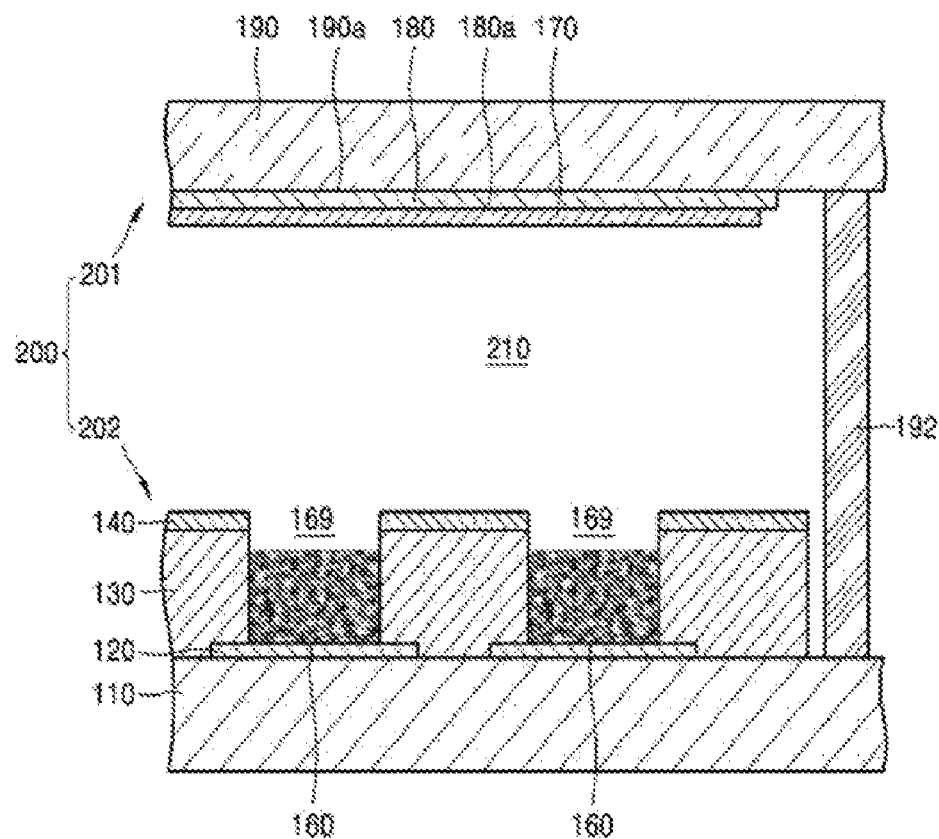
FIG. 7 is a partial cross-sectional view of an electron emitter according to an embodiment of the present invention.
Figure 8:
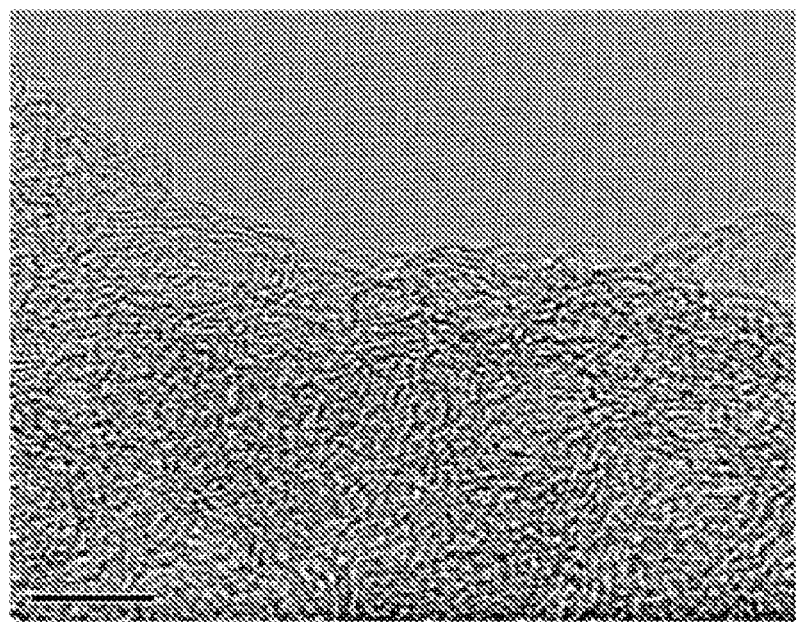
FIGS. 8 and 9 are TEM images of a carbide-derived carbon after synthesizing $Al_4C_3$ according to Example 4.

FIG. 7 is a partial cross-sectional view illustrating an electron emission device 200 according to an embodiment of the present invention. The electron emission device 200 illustrated in FIG. 7 is a triode electron emission device, which is a representative electron emission device.

Referring to FIG. 7, the electron emission device 200 includes an upper plate 201 and a lower plate 202. The upper plate 201 includes an upper substrate 190, an anode electrode 180 formed on a lower surface 190a of the upper substrate 190, and a phosphor layer 170 formed on a lower surface 180a of the anode electrode 180.

The lower plate 202 includes a lower substrate 110 formed opposite to the upper substrate 190 and parallel to the upper substrate 190 so that a predetermined interval is formed between the lower substrate 110 and the upper substrate 190, a stripe-type cathode electrode 120 formed on the lower substrate 110, a stripe-type gate electrode 140 formed to cross the cathode electrode 120, an insulating layer 130 formed between the gate electrode 140 and the cathode electrode 120, electron emitter holes 169 formed in the insulating layer 130 and gate electrode 140, and electron emitters 160 which are formed in the electron emitter holes 169 and electrically connected to the cathode electrode 120 to have a height lower than that of the gate electrode 140.

The upper plate 201 and the lower plate 202 are maintained in position by a pressure lower than atmospheric pressure. A spacer 192 is formed between the upper plate 201 and the lower plate 202 so as to resist the pressure, which is generated by a vacuum, between the upper plate 201 and the lower plate 202 and to maintain an emission space 210.

A high voltage is applied to the anode electrode 180 to accelerate electrons emitted from the electron emitters 160 so that they collide with the phosphor layer 170 at a high speed. The phosphor layer 170 is excited by the electrons and emits visible light as the energy of the electrons drops from a high energy level to a low energy level. When the electron emission device 200 is a color electron emission device, phosphor layers, which emit red, green, and blue light into the emission space 210 forming a unit pixel, are formed on the lower surface 180a of the anode electrode 180.

The gate electrode 140 enables electrons to be easily emitted from the electron emitters 160. The insulating layer 130 defines the electron emitter holes 169 and insulates the electron emitters 160 from the gate electrode 140.

As described above, the electron emitters 160 which emit electrons by forming an electric field include a carbon nanotube hybrid system according to aspects of the present invention.

Various carbon nanotube hybrid systems can be prepared using methods of preparing a carbon nanotube hybrid system according to aspects of the present invention. Further, the carbon nanotube hybrid system can be used not only as an electron emitter but as hydrogen storing material for fuel cells. Further, problems of entanglement and distribution which occur in conventional carbon nanotubes can be overcome by using the carbon nanotube hybrid system having cylindrical carbon nanotubes grown randomly from pores of CDC according to aspects of the present invention.

Further, the carbon nanotube hybrid system according to aspects of the present invention has excellent properties when in ohmic contact with a substrate and excellent uniformity when used as an electron emitter for an electron emission device and a material for a flat fluorescent lamp. An electron emitter device including the carbon nanotube hybrid system according to aspects of the present invention can be effectively used in a vacuum electric device such as a flat display, a television, an X line tube, an emission gate amplifier, or the like in addition to an electron emission device.

Aspects of the present invention will now be described in further detail with reference to the following examples. These examples are for illustrative purposes only, and are not intended to limit the scope of the present invention.

EXAMPLE 1

Preparation of Carbon Nanotube Hybrid System 100 g of α-SiC having an average diameter of 0.7 μm as a carbon precursor was maintained in a high temperature furnace composed of a graphite reaction chamber, a transformer, and the like. 0.5 L of $Cl_2$ gas was applied to the high temperature furnace at 1000° C. per minute for 7 hours. Then, 30 g of carbide-derived carbon was prepared by extracting the Si from the carbon precursor.

The carbide-derived carbon was analyzed using Raman peak analysis, X-ray diffraction, and an electron microscope. As a result, the $I_G/I_D$ ratio was about 0.5 to 1. A weak peak of a graphite (002) surface could be seen at 2θ=25°, and the electron diffraction pattern was a halo-pattern of amorphous carbon. Further, the specific surface area of the carbide-derived carbon after synthesizing the carbide-derived carbon was 1000 to 1100 m²/g.

20 g of the carbide-derived carbon was mixed with 2 g of iron (III) nitrate ($Fe(NO_3)_3$) in an ethanol solution, the mixture was filtered and a hydrogen reduction reaction was performed to prepare a carbon nanotube hybrid system in which carbon nanotubes were grown from the carbide-derived carbon. Raman spectrum of the prepared the carbon nanotube hybrid system was shown in FIG. 2B, and an XRD pattern thereof is shown in FIG. 4.

EXAMPLE 2

Preparation of Carbon Nanotube Hybrid System 9.5 g of carbide-derived carbon was prepared in the same manner as in Example 1 except that 100 g of NiC having an average diameter of 3 μm was used as a starting carbide compound and was heat treated at 500° C. for 2 hours. The carbide-derived carbon was analyzed using Raman peak analysis. The $I_G/I_D$ ratio was about 1 to 1.3. A wide single peak of a graphite (002) surface could be seen at 2θ=25° using the X-ray diffraction. In addition, the specific surface area of the carbide-derived carbon after synthesizing the carbide-derived carbon was 1200 m²/g.

The amount of nickel in the carbide-derived carbon was 10.5 parts by weight based on 100 parts by weight of the total amount of the carbide-derived carbon and nickel.

The resultant was purged with air to completely remove $Cl_2$ gas in the furnace, and ethylene gas was supplied to the furnace and reacted at 900° C. to prepare a carbon nanotube hybrid system in which carbon nanotubes were grown from the carbide-derived carbon.

EXAMPLE 3

Preparation of Carbon Nanotube Hybrid System 13 g of carbide-derived carbon was prepared in the same manner as in Example 1 except that 100 g of ZrC having an average diameter of 5 μm was used as a starting carbide compound and was heat treated at 600° C. for 5 hours. The carbide-derived carbon was analyzed using Raman peak analysis. The $I_G/I_D$ ratio was about 1 to 1.3. A wide single peak of a graphite (002) surface could be seen at 2θ=25° using the X-ray diffraction. In addition, the specific surface area of the carbide-derived carbon after synthesizing the carbide-derived carbon was 1200 m²/g.

A carbon nanotube hybrid system was prepared in the same manner as in Example 1 except that the carbide-derived carbon of Example 3 was used.

EXAMPLE 4

Figure 9:
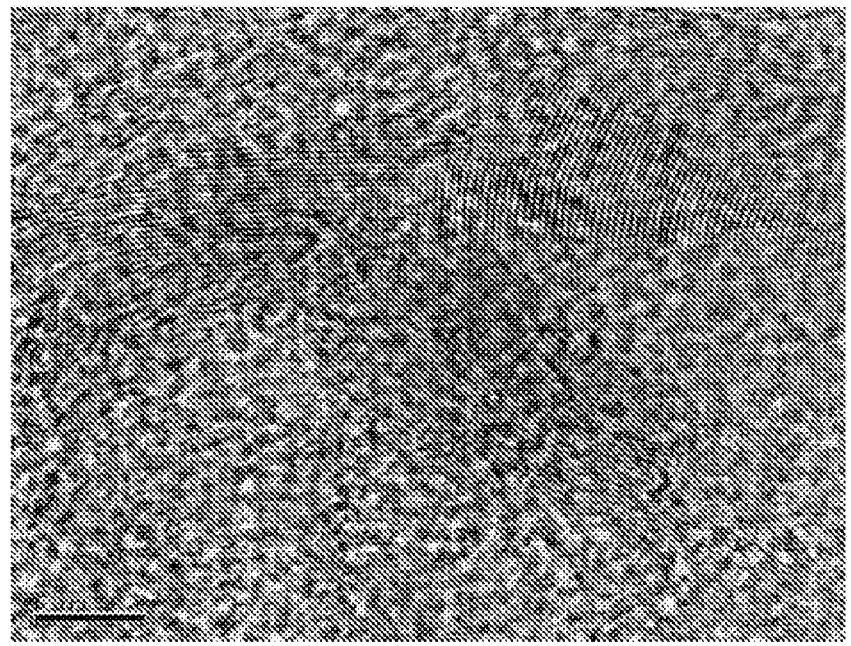

Preparation of Carbon Nanotube Hybrid System 25 g of carbide-derived carbon was prepared in the same manner as in Example 1 except that 100 g of $Al_4C_3$ having an average diameter (325 mesh powder) was used as a starting carbide compound and was heat treated at 700° C. for 5 hours. The carbide-derived carbon was analyzed using Raman peak analysis. The $I_G/I_D$ ratio was about 1 to 3.2. A wide single peak of a graphite (002) surface could be seen at 2θ=25° using the X-ray diffraction. As a result of a high resolution TEM analysis, a plurality of graphite fringes was observed. A TEM image of the carbide-derived carbon is shown in FIG. 9. In addition, the specific surface area of the carbide-derived carbon after synthesizing the carbide-derived carbon was in the range of 1050 to 1100 m²/g.

A carbon nanotube hybrid system was prepared in the same manner as in Example 1 except that the carbide-derived carbon of Example 4 was used.

EXAMPLE 5

Preparation of Carbon Nanotube Hybrid System

Figure 10:
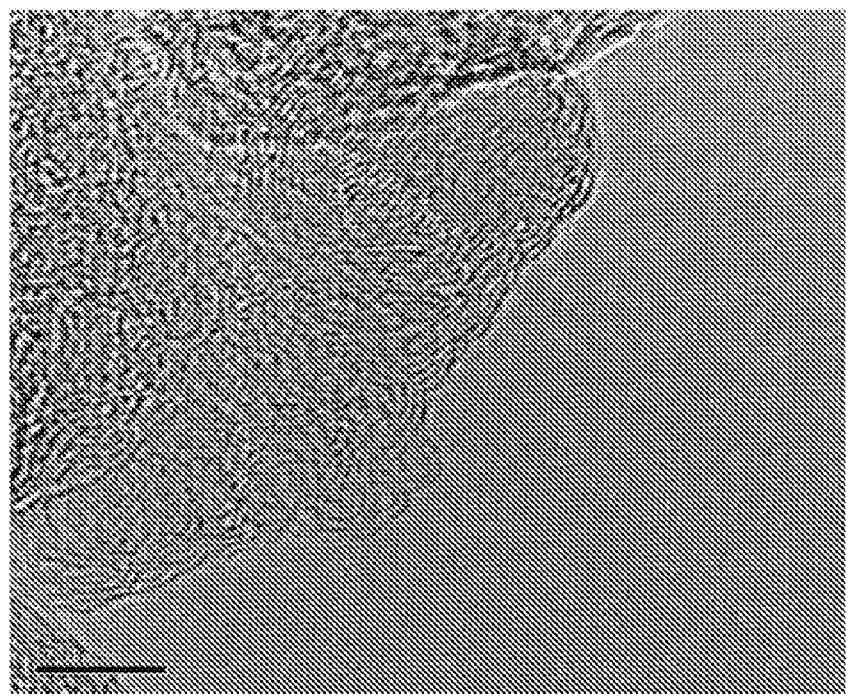
FIG. 10 is a TEM image of carbide-derived carbon after synthesizing $B_4C$ according to Example 5.

Carbide-derived carbon was prepared in the same manner as in Example 1 except that 100 g of $B_4C$ having an average diameter of 0.8 μm was used as a starting carbide compound and was heat treated at 1000° C. for 3 hours. The carbide-derived carbon was analyzed using Raman peak analysis. The $I_G/I_D$ ratio was about 0.4 to 1. A weak peak of a graphite (002) surface could be seen at 2θ=25° using the X-ray diffraction. As a result of a high resolution TEM analysis, it was observed that amorphous openings were partially transformed into graphite fringes. A TEM image of the carbide-derived carbon is shown in FIG. 10. In addition, the specific surface area of the carbide-derived carbon after synthesizing the carbide-derived carbon was 1310 m²/g.

A carbon nanotube hybrid system was prepared in the same manner as in Example 1 except that the carbide-derived carbon of Example 5 was used.

Table 1 briefly shows main properties of the carbide-derived carbon of Examples 1, and 3 through 5.

TABLE 1

|  | Example 1 | Example 3 | Example 4 | Example 5 |
|---|---|---|---|---|
| Starting carbide compound | α-SiC | ZrC | $Al_4C_3$ | $B_4C$ |
| Diameter of particle[1] (μm) | 0.7 | 5 | 10 | 0.8 |
| Crystalline Structure[1] | Hexagonal system | Cubic system | Trigonal system | Trigonal system |
| Main bond[1] | Covalent bond | Ionic bond | Covalent bond | Covalent bond |
| Synthesizing temperature[2] (° C.) | 1000 | 600 | 700 | 1000 |
| Synthesizing time[2] (hour) | 7 | 5 | 5 | 3 |
| Diameter of pore (nm) | 0.7 | 0.6~1.2 | 1.5 | 4.0 |
| Specific surface | 1000~1100 | 1200 | 1050 | 1310 |

TABLE 1-continued

|  | Example 1 | Example 3 | Example 4 | Example 5 |
|---|---|---|---|---|
| area of carbide-derived carbon ($m^2/g$) |  |  |  |  |
| Adsorption type of isothermal nitrogen | I[3] | I[3] | I[3] | IV[4] |
| Volume of opening ($cm^3/cm^3$) | 0.58 | 0.64 | 0.86 | 0.75 |
| Amount of carbide-derived carbon after halogenation (mass %) | 29.8 | 13 | 25 | 20.8 |
| $I_G/I_D$ ratio | 0.5~1 | 1~1.3 | 1~3.2 | 0.4~1 |
| Turn-on electric field ($V/\mu m$)[4] | 6~12 @1/500 duty ratio | 12~14 @1/140 duty ratio[5] | 8~13 @1/140 duty ratio[5] | 10~13 @1/500 duty ratio |
| Electric field emission properties | 100 $\mu A/cm^2$ @10~13 $V/\mu m$ | 100 $\mu A/cm^2$ @14~17 $V/\mu m$ | 100 $\mu A/cm^2$ @12~15 $V/\mu m$ | 100 $\mu A/cm^2$ @13~16 $V/\mu m$ |

[1]property of a carbide compound as a starting material (a diameter of a particle of a starting carbide compound is not varied even after preparing carbide-dervied carbon)
[2]synthesizing condition of carbide-derived carbon
[3]type where adsorption occurs irrespective of a pressure of a gas, an intensity of adsorption is great and adsorption occurs at a specific point
[4]type where a capillary condensation phenomenon at a middle opening and a desorption curve is higher than an adsorption curve irrespective of a relative pressure
[5]Electrons are not emitted at a 1/500 duty ratio, but are emitted at a 1/140 duty ratio Physical properties and electric field emission properties of the carbide-derived carbon of Examples 1 and 3 through 5, similar Raman $I_G/I_D$ ratios, XRD patterns, and TEM morphologies were observed, but differences of electron emission performance were observed. Carbide-derived carbon has different properties and electric field emission efficiencies according to synthesizing conditions although the same carbide compounds were used as a starting material. Different electric field emission properties can be observed according to the kinds of starting materials since a distance between carbon and carbon, distribution of crystalloids, and diameter and volume of openings of an amorphous material of carbide-derived carbon after synthesis are varied although carbide-derived carbon is synthesized under the same synthesizing conditions. However, carbide-derived carbon materials in which electric field emission can occur at a greater than 1/140 duty ratio include carbide-derived carbon whose intensity ratios of graphite G band at 1590 $cm^{-1}$ to a disordered-induced D band at 1350 $cm^{-1}$ are in the range of 0.3 through 5 when the carbide-derived carbon is analyzed using Raman peak analysis; carbon having a specific surface area of 950 $m^2/g$ and more; carbide-derived carbon in which a weak or wide single peak of a graphite (002) surface can be observed at $2\theta=25°$ when analyzing the carbide-derived carbon using X-ray diffraction; and carbide-derived carbon where an electron diffraction pattern is a halo-pattern of amorphous carbon when analyzing the carbide-derived carbon using electron microscopy.

As shown in Table 1, electric field emission properties of carbon nanotube hybrid systems prepared according to Examples 1 and 3 through 5 were measured. As a result, it was shown that the carbon nanotube hybrid systems had excellent electric field emission properties.

EXAMPLE 6

Preparation of Electron Emitter and Electron Emission Device 1 g of the carbon nanotube hybrid system prepared in Example 1, 6.5 g of an acrylate binder, 5.5 g of ethoxylate trimethylolpropane triacrylate, 5.5 g of texanol, 1 g of a photoinitiator and 1 g of di-octyl phthalate 1 g as a plasticizer were mixed, and were dispersed using a 3-roll mill until a well-mixed composition for forming an electron emitter was obtained (repeated 8 times). Screen printing was used to apply the obtained composition to a transparent glass substrate on which an ITO electrode was coated (10×10 mm), and the composition was exposed (at 500 mJ) and developed. Next, the resulting product was sintered under a nitrogen atmosphere at 450° C., and was activated to form cold cathodes. An electron emission device was manufactured using the electron emitter as cold cathodes, a polyethylene terephthalate film having a thickness of 100 $\mu m$ as a spacer, and a copper plate as an anode plate.

The emission current density of the manufactured electron emission device was measured by applying a pulse voltage at a duty ratio of 1/500 having a pulse width of 20 $\mu s$ and a frequency of 100 Hz. As a result, the electron emission device using the carbon nanotube hybrid system according to Example 1 had excellent electron emitting properties. FIG. 5 is a graph illustrating field emission results of a carbon nanotube, a carbide-derived carbon, and a carbon nanotube hybrid system according to an embodiment of the present invention. A single wall carbon nanotube, a carbide-derived carbon, and a carbon nanotube hybrid system were respectively turned on at 1.5 $V/\mu m$, 3.5 $V/\mu m$, and 1.9 $V/\mu m$ and respectively reached 700 $\mu A/cm^2$ at 2.5 $V/\mu m$, 6.3 $V/\mu m$, and 3.5 $V/\mu m$. Although emission efficiency of the carbon nanotube hybrid system is lower than the single wall carbon nanotube, the carbon nanotube hybrid system has sufficient emission efficiency for field emission applications and has excellent properties in uniform emission, Ohmic contact, lifetime, and the like.

A similar experiment to measure performance was conducted in the other electron emission devices using the other carbide nanotube hybrid systems. As a result, the other electron emission devices were found to have similar electron emission properties as the electron emission device using the carbon nanotube hybrid system according to Example 1.

The carbon nanotube hybrid system according to aspects of the present invention has an excellent uniformity and a long lifetime. An electron emitter having improved electron emitting properties can be inexpensively prepared using the carbon nanotube hybrid system according to aspects of the present invention compared to conventional carbon nanotubes. Further, an electron emission device having excellent electron emitting properties can be prepared using the electron emitter according to aspects of the present invention.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A carbon nanotube hybrid system, comprising:
   carbide-derived carbon formed by reacting a carbide compound and a halogen group containing gas to extract elements of the carbide compound except carbon;
   a metal supported on the carbide-derived carbon; and
   carbon nanotubes grown on the carbide-derived carbon from a supplied carbon source,
   wherein the carbide-derived carbon comprises bending graphite sheets having open pores.

2. The carbon nanotube hybrid system of claim 1, wherein the metal is at least one of Ni, Co, Fe, or W in an amount of 0.1 to 20 parts by weight based on 100 parts by weight of the total amount of the metal and the carbide-derived carbon.

3. The carbon nanotube hybrid system of claim 2, wherein the metal further comprises Mo.

4. The carbon nanotube hybrid system of claim 1, wherein the carbon nanotubes are disposed in a same direction or in random directions.

5. The carbon nanotube hybrid system of claim 4, wherein the carbon nanotubes are perpendicular to a surface of the bending graphite sheets of the carbide-derived carbon.

6. The carbon nanotube hybrid system of claim 1, wherein the carbide-derived carbon has intensity ratios of a graphite G band at 1590 $cm^{-1}$ to a disordered-induced D band at 1350 $cm^{-1}$ in the range of 0.3 to 5 when analyzed using Raman peak analysis.

7. The carbon nanotube hybrid system of claim 1, wherein a B.E.T. surface area of the carbide-derived carbon is greater than 950 $m^2/g$.

8. The carbon nanotube hybrid system of claim 1, wherein the carbide-derived carbon has a weak peak or a wide single peak of a graphite (002) surface at $2\theta=25°$ when analyzed using X-ray diffraction.

9. The carbon nanotube hybrid system of claim 1, wherein an electron diffraction pattern of the carbide-derived carbon is a halo-pattern of amorphous carbon when analyzed using electron microscopy.

10. The carbon nanotube hybrid system of claim 1, wherein the carbide compounds comprise at least one carbide compound selected from the group consisting of $SiC_4$, $B_4C$, TiC, zirconium carbide, $Al_4C_3$, $CaC_2$, titanium tantalum carbide, molybdenum tungsten carbide, titanium carbonitride, and zirconium carbonitride.

11. The carbon nanotube hybrid system of claim 1, wherein all elements of the carbide compound except carbon are extracted.

12. The carbon nanotube hybrid system of claim 1, wherein the metal supported on the carbide-derived carbon is derived from the carbide compound and not extracted therefrom by the halogen group containing gas.

13. The carbon nanotube hybrid system of claim 1, wherein the carbon nanotubes grow from the pores of the bending graphite sheets of the carbide-derived carbon.

14. The carbon nanotube hybrid system of claim 13, wherein the bending graphite sheets further comprises surfaces, and the carbon nanotubes grow from the surfaces of the bending graphite sheets of the carbide-derived carbon.

15. A method of preparing a carbon nanotube hybrid system, the method comprising:
   forming a carbide-derived carbon of bending graphite sheets having open pores by extracting all elements of a carbide compound except carbon by reacting the carbide compound and a halogen group containing gas;
   mixing the carbide-derived carbon with a catalyst metal-containing compound and performing a hydrogen reduction reaction to transfer a catalyst metal from the catalyst metal-containing compound to the carbide-derived carbon; and
   reacting the prepared carbide-derived carbon and a carbon source to grow carbon nanotubes from the prepared carbide-derived carbon.

16. A method of preparing a carbon nanotube hybrid system, the method comprising:
   forming a carbide-derived carbon of bending graphite sheets having open pores by extracting elements of a carbide compound except carbon by reacting the carbide compound and a halogen group containing gas; and
   reacting the carbide-derived carbon and a carbon source to grow carbon nanotubes from the prepared carbide-derived carbon.

17. The method of claim 16, wherein a metal remains in the carbide-derived carbon after the extracting of the elements of the carbide compound.

18. The method of claim 17, wherein the metal remains in an amount in the range of 0.1 to 20 parts by weight based on 100 parts by weight of a total amount of the metal and the carbide-derived carbon.

19. An electron emitter, comprising:
   a carbon nanotube hybrid system according to claim 1.

20. An electron emission device, comprising:
   an electron emitter according to claim 19.

* * * * *